S. BARNES.

Manufacture of Toilet-Brushes.

No. 5,168. Reissued Dec. 3, 1872.

Witnesses.

E. N. Johnson

J. P. Spanford

Inventor.

Stephen Barnes

Jno. C. Omgin

Atty.

AM. PHOTO-LITHOGRAPHIC CO. N.Y. (OSBORNE'S PROCESS.)

UNITED STATES PATENT OFFICE.

STEPHEN BARNES, OF NEW HAVEN, CONNECTICUT.

IMPROVEMENT IN THE MANUFACTURE OF TOILET-BRUSHES.

Specification forming part of Letters Patent No. 21,464, dated September 7, 1858; extended seven years; reissue No. 5,168, dated December 3, 1872.

DIVISION A.

*To all whom it may concern:*

Be it known that I, STEPHEN BARNES, of New Haven, in the county of New Haven and State of Connecticut, have invented certain new and useful Improvements in the Manufacture of Brushes, of which the following is a specification:

*Nature and Objects of the Invention.*

My invention relates to the manufacture of brushes; and the invention consists in a novel manner of making the brush by means of a removable tubular block or die to receive and hold the bristles while the body of the brush is cast or cemented thereto; and has for its object to cheapen the cost of brushes, and produce a superior article of brush, as will be fully set forth hereafter.

*General Description.*

Figure 1:
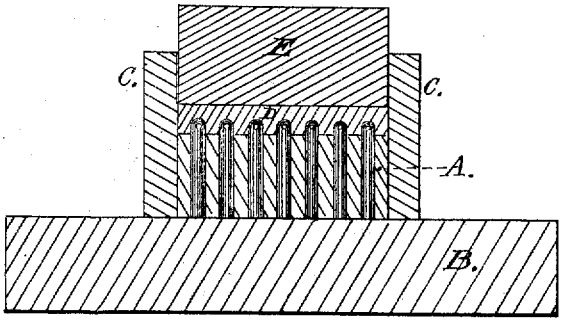
Figure 1 is a sectional elevation of my apparatus, showing a complete brush.
Figure 2:
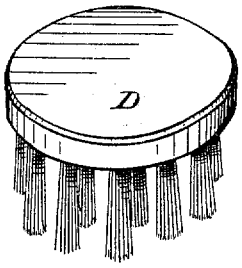
Fig. 2 is a perspective view of a brush when completed, though it is not of any of the forms or shapes in common use for a toilet-brush.
Figure 3:
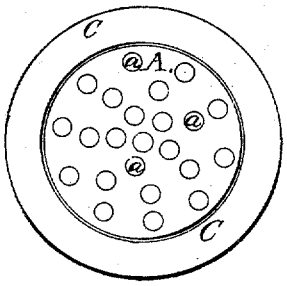
Fig. 3 is a plan view of the apparatus for making the brush.
Figure 4:
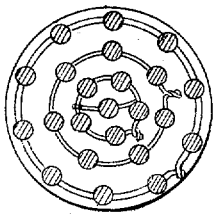
Fig. 4 is a plan view of the tubular block or die in which the bristles are inserted, held, and secured for casting or cementing the body of the brush.

A is the removable block or die, in which the bristles are inserted and held while the back of the brush is cast or cemented thereto. This block has holes *a a* made therein, as shown in Fig. 3, into which the bristles are inserted in the desired tufts. The bristles are made the proper length, and the ends forced into the holes *a a* by the hand; or if used double they may be looped over a string or wire, the ends of which are inserted into the holes, and the bristles drawn in in that way. After the holes in the block or die are filled with bristles, as shown in Fig. 4, the block A with the bristles in it is placed upon the plate B, or its equivalent, the bristles having been trimmed or cut to the proper length for the brush. The hoop C, which coincides with the die-block in shape, is then placed in position, as shown in Figs. 1 and 3, and the composition D poured in in a melted or plastic state, and is then pressed into form by the follower E. The hoop C and follower E should be heated when the composition is poured, but not so hot as to injure the bristles by heat.

The form of brush represented is not a common one for toilet or other brushes, and it is chosen for its simplicity and ease of representation. In practice, other and such forms as may be desired for the brush will be used.

The composition of which I make the handle of the brush and secure the bristles thereto is made by mixing two parts of gum shellac with one part of Breckenridge coal, the latter pulverized, and both hot when mixed, to which is added one-eighth part plumbago. The proportions of these ingredients are not absolutely essential, as they may be varied, and coloring material may be inserted to give the brush back and handle any desired shade or color.

In making the brushes sufficient pressure must be given to fill the dies completely, and also to impart a polish on the parts of the die that are polished.

It will be observed that in the construction shown the bristles are supported by their ends resting upon the bed B, while at the same time the sides are so supported by the tubes as to prevent them from crippling. By this means the bristles are made to support themselves sufficiently against the pressure to which they are exposed in pressing up the handle of the brush—or, in other words, the backing of the composition in which the bristles are cast or secured.

*Claim.*

Having thus fully described my invention, what I claim as new therein, and desire to secure by Letters Patent, is—

The employment and use of a tubular or perforated block A, or its equivalent, into which the bristles are inserted in separate tufts, and secured to a composition handle by pressure between dies, substantially in the manner described and set forth.

STEPHEN BARNES.

Witnesses:

LEAVETT L. PHELPS,
LUCIUS G. PECK.